(12) United States Patent
Choo et al.

(10) Patent No.: US 7,758,999 B2
(45) Date of Patent: Jul. 20, 2010

(54) SECONDARY BATTERY MODULE

(75) Inventors: Hyun Suk Choo, Seoul (KR); Ji Sang Yu, Daejeon (KR)

(73) Assignee: LG Chem, Ltd. (KR)

( * ) Notice: Subject to any disclaimer, the term of this patent is extended or adjusted under 35 U.S.C. 154(b) by 1318 days.

(21) Appl. No.: 11/247,837

(22) Filed: Oct. 10, 2005

(65) Prior Publication Data

US 2006/0083980 A1   Apr. 20, 2006

(30) Foreign Application Priority Data

Oct. 8, 2004   (KR) ...................... 10-2004-0080322

(51) Int. Cl.
*H01M 6/42* (2006.01)
*H01M 2/00* (2006.01)
*H01M 6/46* (2006.01)

(52) U.S. Cl. ........................ 429/149; 429/148; 429/152

(58) Field of Classification Search ........................ None
See application file for complete search history.

(56) References Cited

U.S. PATENT DOCUMENTS

| | | | | |
|---|---|---|---|---|
| 5,419,982 | A * | 5/1995 | Tura et al. .................... | 429/162 |
| 5,998,060 | A * | 12/1999 | McGrady ..................... | 429/121 |
| 2001/0007728 | A1 * | 7/2001 | Ogata et al. ................. | 429/120 |
| 2003/0049527 | A1 * | 3/2003 | Yageta et al. ............... | 429/179 |
| 2003/0064283 | A1 * | 4/2003 | Uemoto et al. .............. | 429/149 |
| 2005/0123828 | A1 * | 6/2005 | Oogami et al. .............. | 429/152 |

* cited by examiner

*Primary Examiner*—Dah-Wei D Yuan
*Assistant Examiner*—Adam A Arciero
(74) *Attorney, Agent, or Firm*—Cantor Colburn LLP

(57) ABSTRACT

A secondary battery module comprises at least two battery cells laminated to a designated depth, in which an air guide block is interposed between leveled surfaces of the neighboring battery cells and a fixing block is interposed between protruded surfaces of the neighboring battery cells, the air guide blocks and the fixing blocks are fixed to each other using fasteners, and corresponding electrode terminals of the neighboring battery cells are interconnected in series by conductive and insulating connection members serving as bolts and nuts, thereby being conveniently installed in various industrial facilities and electric vehicles.

8 Claims, 6 Drawing Sheets

SECONDARY BATTERY MODULE

FIELD OF THE INVENTION

The present invention relates to a secondary battery module, and more particularly to a secondary battery module having at least two battery cells laminated to a designated depth, in which an air guide block is interposed between leveled surfaces of the neighboring battery cells and a fixing block is interposed between protruded surfaces of the neighboring battery cells, the air guide blocks and the fixing blocks are fixed to each other using fasteners, and corresponding electrode terminals of the neighboring battery cells are interconnected in series by conductive and insulating connection members serving as bolts and nuts, thereby being conveniently installed in various industrial facilities and electric vehicles.

BACKGROUND OF THE INVENTION

Generally, since the output of one unit battery is limited, a battery module comprising a plurality of battery cells is used in electric vehicles and leisure facilities requiring the large scale output.

As shown in FIG. 1, a conventional battery module 1 comprises a plurality of battery cells 2 arranged in a line, two end plates 3 contacting outer surfaces of the outermost battery cells 2 and having a plurality of screw holes 3a formed along left and right edges thereof, and two plate-shaped supporters 5 arranged along side surfaces of the battery cells 2 for fixedly contacting the battery cells 2 through the two end plates 3 and having vertical fixing portions 5a vertically bent from both ends thereof.

Here, screw holes 5b spaced from each other by a designated interval are formed through the vertical fixing portions 5a of the plate-shaped supporters 5, and a plurality of cooling holes 5c spaced from each other by a designated interval are formed through bodies of the plate-shaped supporters 5 for discharging heat, generated from the battery cells 2, to the outside.

Since electrode terminals of one battery cell 2 and corresponding electrode terminals of the neighboring battery cell 2 are fixed to each other with leads 6 by welding, it is inconvenient to manufacture the conventional battery module 1 according to various electric power requirements of industrial facilities and electric vehicles.

Further, since the conventional battery module 1 is configured such that front and rear surfaces of the battery cells 2 contact front and rear surfaces of the neighboring battery cells 2 by the plate-shaped supporters 5 and the end plates 3, heat generated from the battery cells 2 exerts a negative influence upon the neighboring battery cells 2, thereby reducing the performance of the battery module 1.

Moreover, since the battery cells 2 of the battery module 1 are fixed by the adhesive force of the long plate-shaped supporters 5 and the end plates 3, when impact is applied to the intermediate battery cell 2, the battery cell 2 to which impact is applied slips from the neighboring battery cells 2, and the fixed state of the battery module 1 becomes unstable.

SUMMARY OF THE INVENTION

Therefore, the present invention has been made in view of the above problems, and it is an object of the present invention to provide a secondary battery module having a designated number of battery cells laminated to a designated depth according to electricity requirements of various industrial facilities and electric vehicles, in which corresponding electrode terminals of the neighboring battery cells are detachably interconnected using conductive connection members and insulating connection members, thereby being conveniently and rapidly manufactured.

It is another object of the present invention to provide a secondary battery module, in which an air guide block is interposed between leveled surfaces of the neighboring battery cells and a fixing block is interposed between protruded surfaces of the neighboring battery cells, thereby rapidly discharging heat generated from the battery cells to the outside, and maintaining a stable fixed state of the secondary battery module even when external impact is applied to a designated battery cell.

In accordance with an aspect of the present invention, the above and other objects can be accomplished by the provision of a secondary battery module comprising: at least two battery cells, each having a protruded surface and a leveled surface, arranged such that the protruded surfaces of the neighboring battery cells face each other and the leveled surfaces of the neighboring battery cells face each other; at least one fixing block disposed along the edge of the protruded surface of the corresponding battery cell for fixing the corresponding battery cell and the neighboring battery cell to each other; at least one air guide block disposed along at least a part of the edge of the leveled surface of the corresponding battery cell for discharging the heat generated from the battery module to the outside; conductive connection members and insulating connection members for interconnecting electrode terminals of the battery cells so that the corresponding battery cell forms one series circuit with other battery cells; and a plurality of fasteners for integrally fixing the battery cells after the battery cells contact each other by the fixing block and the air guide block.

The secondary battery module of the present invention comprises a designated number of battery cells according to electricity requirements of various industrial facilities and electric vehicles, in which electrode terminals of the battery cells are detachably interconnected using conductive and insulating connection members serving as bolts and nuts, thereby being conveniently and rapidly manufactured.

Further, since an air guide block is interposed between leveled surfaces of the neighboring battery cells and a fixing block is interposed between protruded surfaces of the neighboring battery cells, the secondary battery module of the present invention rapidly discharges heat generated from the battery cells to the outside, and maintains a stable fixed state even when external impact is applied to a designated battery cell.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF PREFERRED EMBODIMENTS

Now, a preferred embodiment of the present invention will be described in detail with reference to FIGS. 2 to 6.

Figure 1:
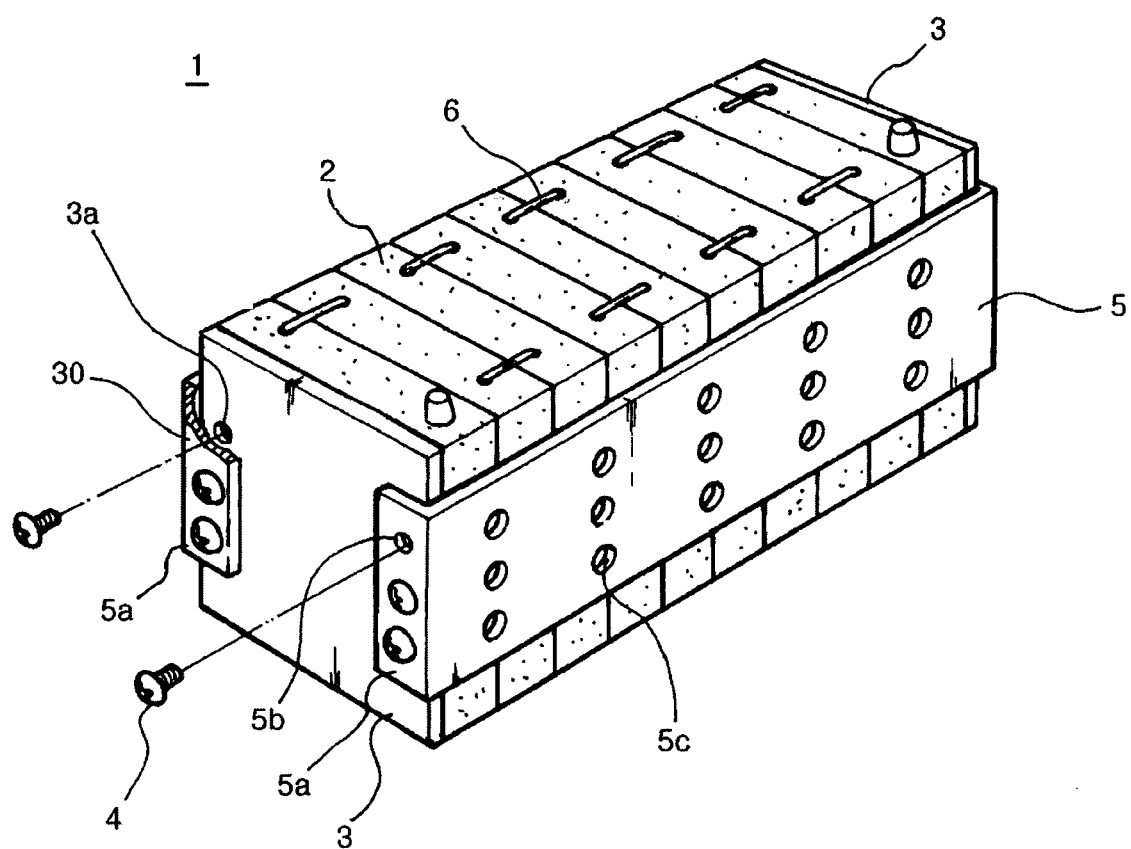
FIG. 1 is a perspective view of a conventional secondary battery module for electric vehicles.
Figure 2:
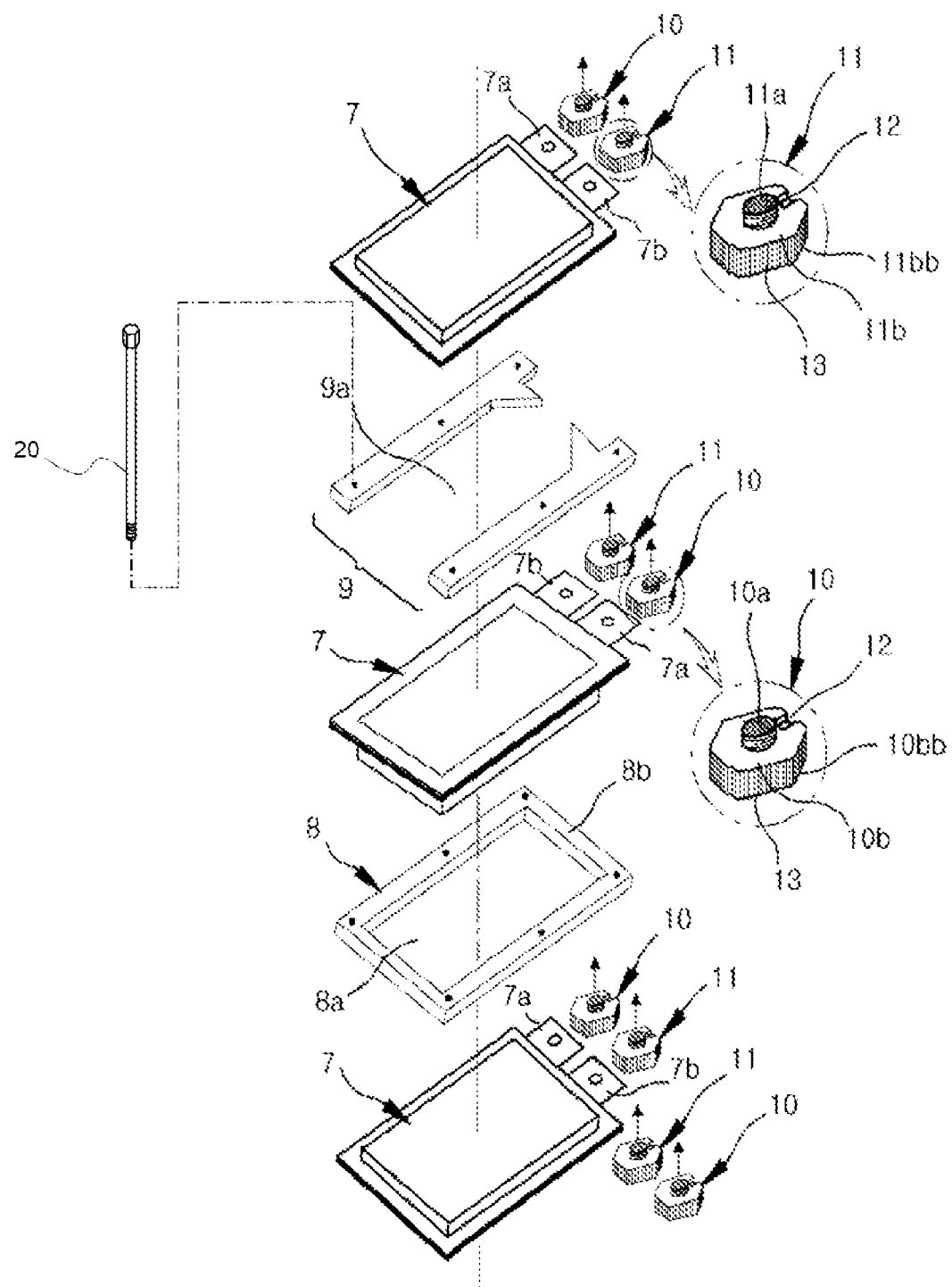
FIG. 2 is an exploded perspective view of a secondary battery module in accordance with the present invention.
Figure 3:
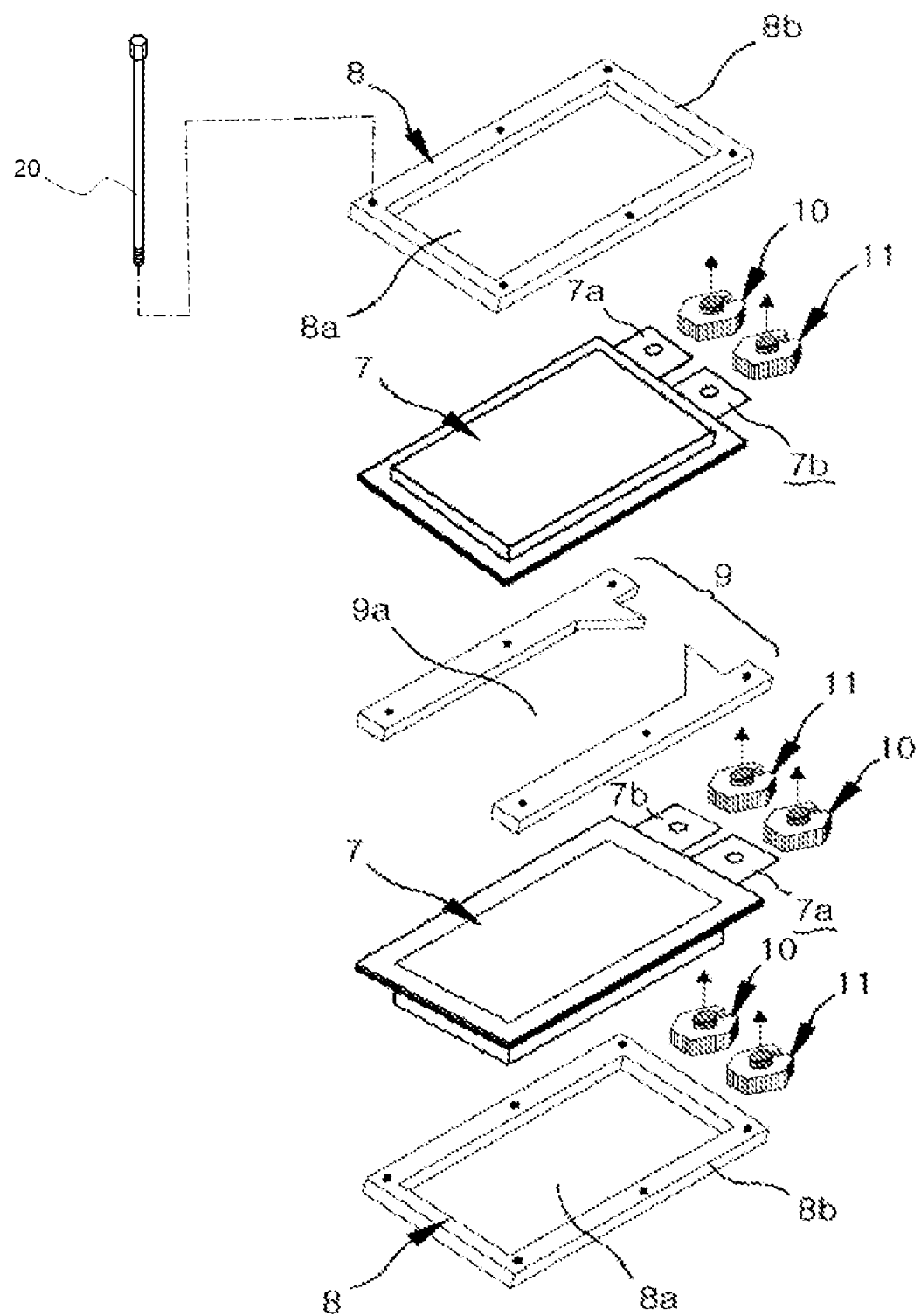
FIG. 3 is an exploded perspective view of the secondary battery module of the present invention in a state in which leveled surfaces of battery cells are fixed to each other.
Figure 4:
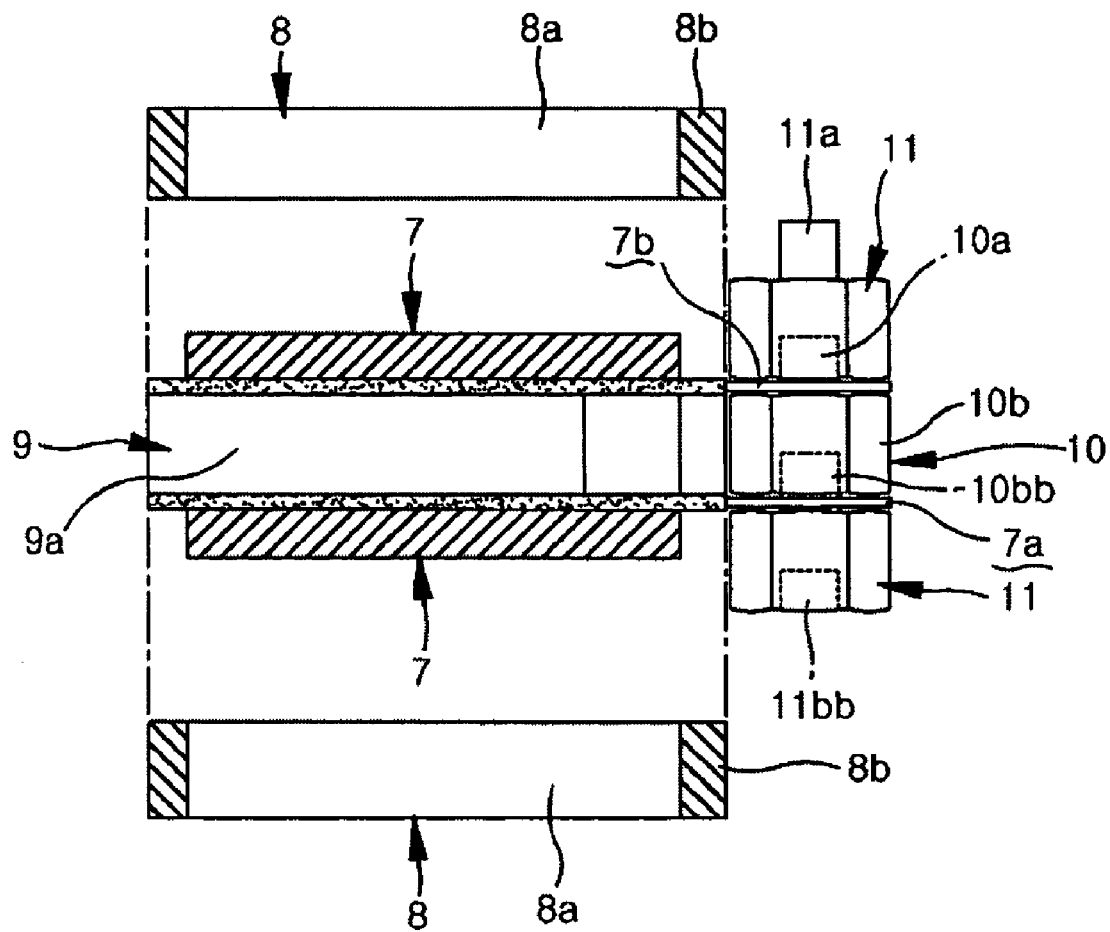
FIG. 4 is a partial longitudinal sectional view of the secondary battery module of the present invention shown in FIG. 3, illustrating a state in which corresponding electrode terminals of the neighboring battery cells, each having two electrode terminals, are interconnected using conductive and insulating connection members.
Figure 5:
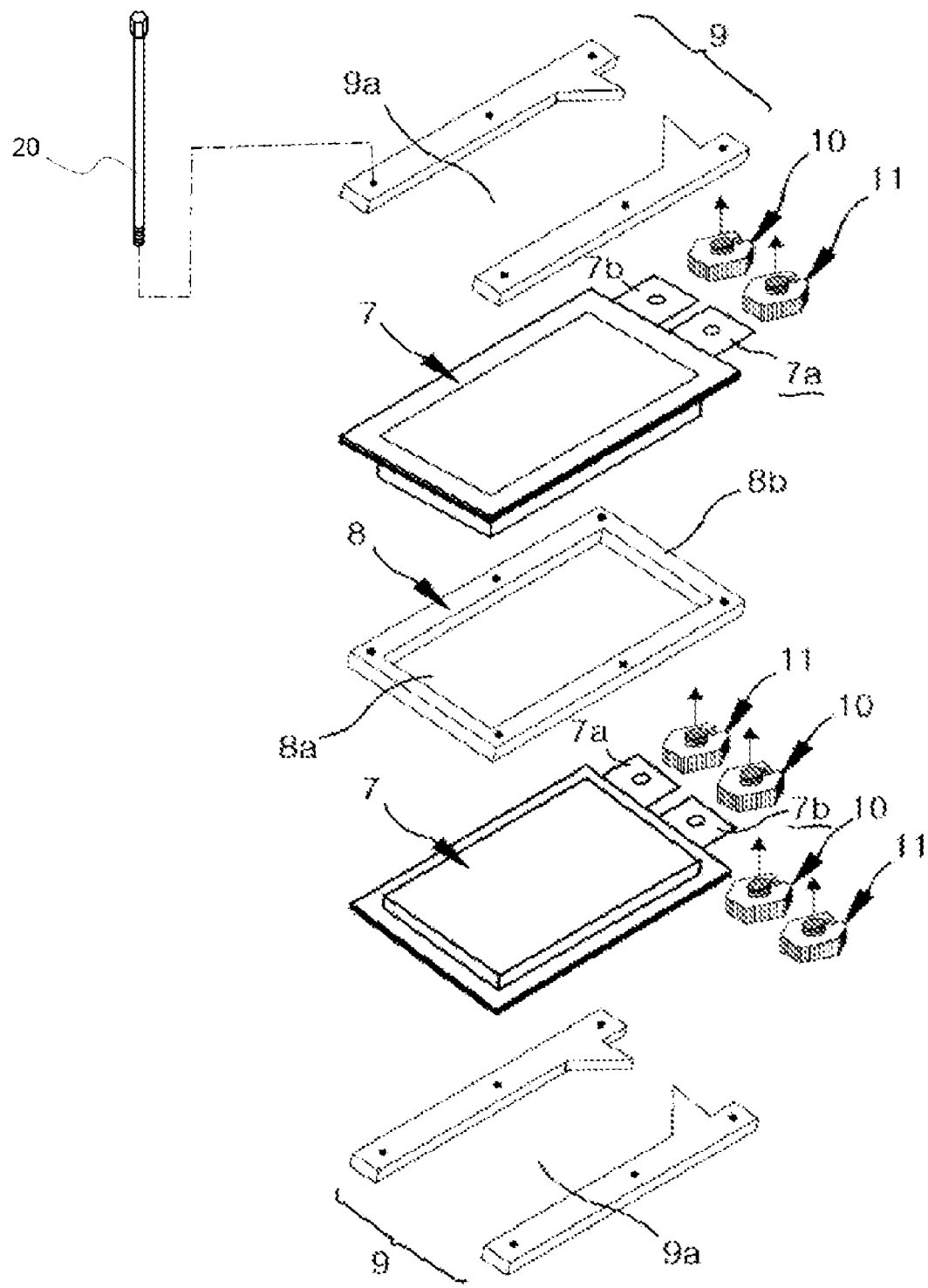
FIG. 5 is an exploded perspective view of the secondary battery module of the present invention, illustrating a state in which protruded surfaces of the neighboring battery cells are fixed to each other.
Figure 6:
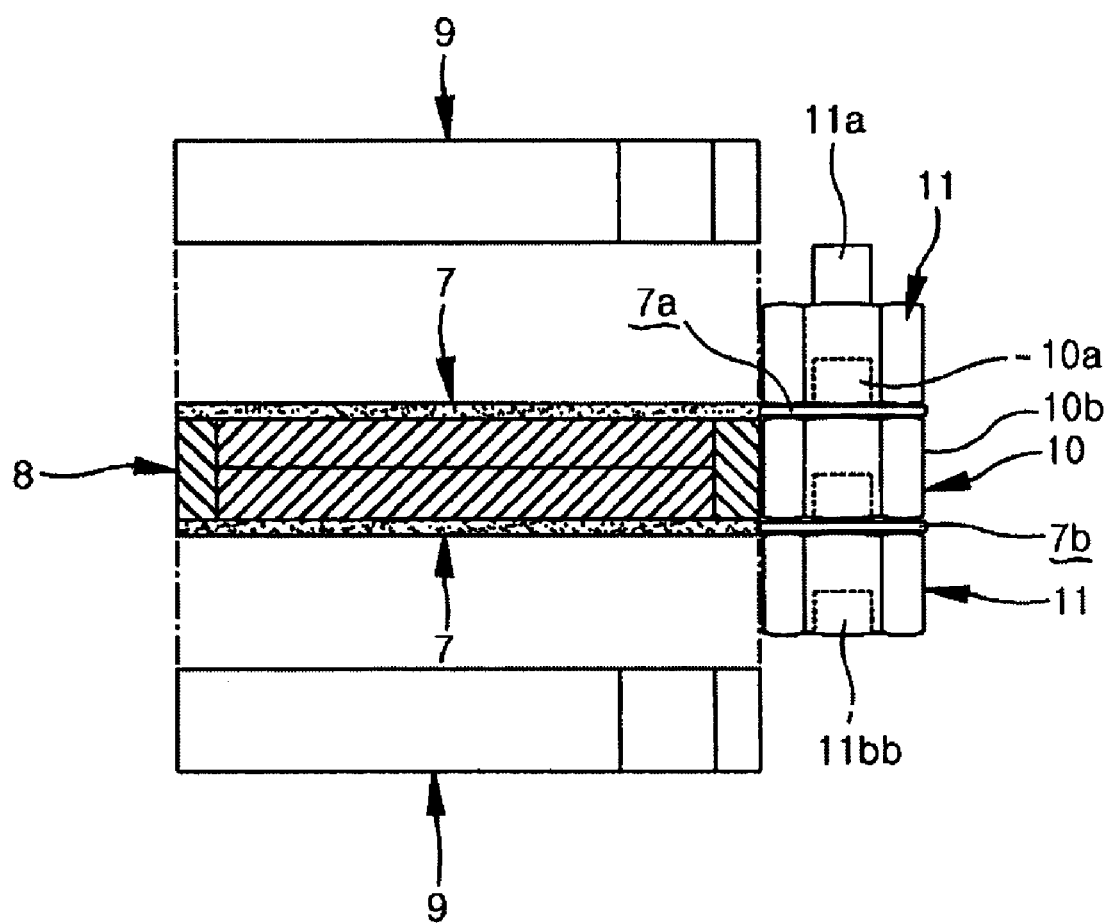
FIG. 6 is a partial longitudinal sectional view of the secondary battery module of the present invention shown in FIG. 5, illustrating a state in which corresponding electrode terminals of the neighboring battery cells, each having two electrode terminals, are interconnected using conductive and insulating connection members.

FIG. 2 is an exploded perspective view of a secondary battery module in accordance with the present invention.

As shown in FIG. 2, the secondary battery module of the present invention comprises at least two battery cells 7, each having a protruded surface and a leveled surface, arranged such that the protruded surfaces of the neighboring battery cells 7 face each other and the leveled surfaces of the neighboring battery cells 7 face each other, at least one fixing block 8 disposed along the edge of the protruded surface of the corresponding battery cell 7 for fixing the corresponding battery cell 7 and the neighboring battery cell 7 to each other, at least one air guide block 9 disposed along at least a part of the edge of the leveled surface of the corresponding battery cell 7 for discharging the heat generated from the corresponding battery cell 7 to the outside; conductive connection members 10 and insulating connection members 11 for interconnecting electrode terminals 7a and 7b of the battery cells 7 so that the corresponding battery cell 7 forms one series circuit with other battery cells 7, and a plurality of fasteners 20 for integrally fixing the battery cells 7 after the battery cells 7 contact each other by the fixing block 8 and the air guide block 9.

Preferably, the fixing block 8 comprises a hollow 8a surrounding the protruded surfaces of the neighboring two battery cells 7, and a supporter 8b having a size larger than the edges of the neighboring two battery cells 7.

Preferably, the air guide block 9 comprises an air channel 9a having a designated shape for smoothly discharging heat generated from the corresponding battery cells 7 to the outside, and the air channel 9a is partially narrowed so that the air passing through a space between the neighboring battery cells 7 is converted from a laminar flow to a turbulent flow.

The air channel 9a of the air guide block 9 is configured such that air smoothly passes from one side of the air channel 9a to the other side of the air channel 9a, and is made of independent two elements or one element.

Preferably, each of the conductive connection members 10 comprises a boss 10a with a screw thread formed on one side thereof and a main body 11b having a hole 10bb with a screw thread formed on the other side thereof so as to correspond to the screw thread of the boss 10a, so that the conductive connection member 10 is connected to the alternately disposed insulating connection member 11 (with reference to FIG. 2). Further, preferably, each of the insulating connection members 11 comprises a boss 11a with a screw thread formed on one side thereof and a main body 11b having a hole 11bb with a screw thread formed on the other side thereof so as to correspond to the screw thread of the boss 11a, so that the insulating connection member 11 is connected to the alternately disposed conductive connection member 10 (with reference to FIG. 2).

The bottom surface of the main body 10b of the conductive connection member 10 electrically contacts the electrode terminal 7a or 7b of the lower battery cell 7, and the top surface of the main body 10b of the conductive connection member 10 electrically contacts the corresponding electrode terminal 7a or 7b of the upper battery cell 7. Thereby, the lower battery cell 7 and the upper battery cell 7 are interconnected in series.

The insulating connection member 11 of the battery cell 7, which faces the conductive connection member 10, has the same structure as that of the conductive connection member 10, but is made of an insulating material, thereby serving as a spacer for spacing the electrode terminal 7a or 7b of the battery cell 7 from the corresponding electrode terminal 7a or 7b of the neighboring battery cell 7.

A voltage measuring groove 12, which is opened in the radial direction, is formed in the main body 10b of the conductive connection member 10. In order to measure the voltage of the lower and upper battery cells 7, which are laminated to a designated depth, two measuring terminals of a voltage measuring instrument (not shown) are connected to the voltage measuring grooves 12 of the conductive connection member 10 of the corresponding battery cells 7, thereby conveniently measuring the voltage across the corresponding battery cells 7.

Further, a plurality of grooves 13 having a designated pattern for discharging heat generated from the corresponding battery cell 7 to the outside are formed in the outer cylindrical surfaces of the main bodies 10b and 11b of the conductive and insulating connection members 10 and 11. The grooves 13 are parallel with axes of the corresponding conductive and insulating connection members 10 and 11.

The fasteners 20 comprise bolts and nuts, or female and male snaps. When one of the female and male snaps is installed on the fixing block 8, the other one of the female and male snaps is fixed to the air guide block 9.

The air guide block 9 interposed between the leveled surfaces of the neighboring battery cells 7 has a thickness approximately equal to the total sum of the thicknesses of the protruded surfaces of the neighboring battery cells 7. As a result, the conductive and insulating connection members 10 and 11, which have the same size, are conveniently treated.

Hereinafter, the assembly process and operation of the above secondary battery module of the present invention will be described in detail.

One of the fixing block and air guide block may be located under the lowermost battery cell of the secondary battery module of the present invention, as shown in FIGS. 3 to 6. However, for convenience, a battery module in which the fixing block is located under the lowermost battery cell will be described as follows.

First, the fixing block 8 is located on a worktable (not shown). Then, the protruded surface of one battery cell 7 is inserted into the hollow 8a of the fixing block 8 so that the edge of the battery cell 7 is located on the supporter 8b of the fixing block 8 (with reference to FIGS. 3 and 4).

Thereafter, the air guide block 9 is located on the edge of the leveled surface of the battery cell 7, and the leveled surface of another battery cell 7 is located on the upper surface of the air guide block 8 so that the leveled surface of the upper battery cell 7 faces the leveled surface of the lower battery cell 7.

Thereafter, the conductive connection member 10 is interposed between one of the electrode terminals 7a and 7b of the lower battery cell 7 and the corresponding one of the electrode terminals 7a and 7b of the upper battery cell 7 so that the electrode terminal 7a or 7b of the lower battery cell 7 and the electrode terminal 7a or 7b of the upper battery cell 7 are interconnected in series. Then, the corresponding parts (the boss 11a or the groove 11bb) of the insulating connection member 11 are inserted into the groove 10bb and the boss 10a of the conductive connection member 10.

Here, the electrode terminal 7a or 7b of the lower battery cell 7 contacts the bottom surface of the main body 10b of the conductive connection member 10, and the corresponding electrode terminal 7a or 7b of the upper battery cell 7 contacts the surface of the conductive connection member 10 under the boss 10a, i.e., the top surface of the conductive connection member 10.

Thereafter, in the same manner, the insulating connection member 11 is interposed between the other one of the electrode terminals 7a and 7b of the lower battery cell 7 and the corresponding one of the electrode terminals 7a and 7b of the upper battery cell 7, and the corresponding parts (the boss 10a or the groove 10bb) of the conductive connection member 10 are inserted into the groove 11bb and the boss 11a of the insulating connection member 10. The above electrode terminals 7a or 7b of the upper and lower battery cells 7 are insulated from each other by the body 11b of the insulating connection member 11.

In the case that a user wants to further laminate a desired number of battery cells 7, the battery cells 7 are laminated such that the protruded surfaces of the battery cells 7 face each other by the fixing block 8 interposed therebetween and the leveled surfaces of the battery cells 7 face each other by the air guide block 9 interposed therebetween. Then, as described above, the conductive connection member 10 and the insulating connection member 11 are connected to the corresponding electrode terminals of the corresponding battery cells 7 so that the neighboring battery cells 7 are interconnected in series.

Under the condition that the fixing block 8, the battery cell 7, the air guide block 9, the battery cell 7, and the fixing block 8 are laminated, a bolt having a proper length is inserted into a hole formed through a portion of one corner of the upper fixing block 8 and is fixed to a nut provided on the lower fixing block 8, and another bolt is inserted into a hole formed through a portion of the diagonal corner of the upper fixing bock 8 and is fixed to another nut provided on the lower fixing block 8. Then, other corners of the upper fixing block 8 are fixed to the lower fixing block 8 using bolts and nuts. Thereby, the manufacturing of one battery module is completed.

Instead of the above-described bolts and nuts, the fixing blocks 8 and the air guide block 9 may be fixed using other fasteners, such as snaps (not shown). In the case that the fixing blocks 8 and the air guide block 9 are fixed using snaps, female and male snaps formed on the fixing blocks 8 and the air guide block 9 are engaged with each other when the fixing blocks 8 and the air guide block 9 are laminated.

INDUSTRIAL APPLICABILITY

As apparent from the above description, the present invention provides a secondary battery module having a designated number of battery cells according to electricity requirements of various industrial facilities and electric vehicles, in which electrode terminals of the battery cells are detachably interconnected using conductive and insulating connection members serving as bolts and nuts, thereby being conveniently and rapidly manufactured.

Further, since an air guide block is interposed between leveled surfaces of the neighboring battery cells and a fixing block is interposed between protruded surfaces of the neighboring battery cells, the secondary battery module of the present invention rapidly discharges heat generated from the battery cells to the outside, and maintains a stable fixed state even when external impact is applied to a designated battery cell.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. A secondary battery module comprising:
   at least three battery cells, each battery cell having a protruded surface and a leveled surface opposite to the protruded surface, wherein the protruded surfaces of neighboring battery cells of the at least three battery cells face each other and the leveled surface of one of the neighboring cells and the leveled surface another adjacent battery cell of the at least three battery cells face each other;
   at least one fixing block disposed along an edge of the protruded surface of a corresponding battery cell, the fixing block fixing neighboring battery cells of the at least three battery cells to each other;
   at least one air guide block disposed along at least a part of an edge of the leveled surface of the corresponding battery cell, the air guide block defining an air channel and comprising a protrusion, wherein the protrusion converts laminar air flow to turbulent air flow, and the turbulent air flow discharges heat from the battery module to the outside;
   conductive connection members and insulating connection members, which interconnect electrode terminals of the battery cells in series; and
   a plurality of fasteners, which integrally fix the battery cells, the fixing blocks and the air guide blocks,
   wherein the fixing block defines a hollow and surrounds the protruded surfaces of the neighboring battery cells of the at least three battery cells, and the fixing block comprises a supporter, which has a dimension which is greater than a corresponding dimension of the neighboring battery cells of the at least three battery cells.

2. The secondary battery module as set forth in claim 1, wherein each of the conductive and insulating connection members comprises a boss with a screw thread formed on one side thereof, and a main body having a hole with a screw thread formed on the other side thereof.

3. The secondary battery module as set forth in claim 2, wherein the bottom surface of the main body of the conductive connection member electrically contact one of the electrode terminals of the lower battery cell, and the top surface of the main body of the conductive connection member electrically contact the corresponding one of the electrode terminals of the upper battery cell, so that the upper and lower battery cells are interconnected in series.

4. The secondary battery module as set forth in claim 1, wherein a voltage measuring groove, which opens in a radial direction, is formed in the main body of each of the conductive connection members.

5. The secondary battery module as set forth in claim 1, wherein a plurality of grooves have a designated pattern, which discharges heat generated from the corresponding battery cells to the outside, and the grooves are formed in the outer cylindrical surfaces of main bodies of the conductive and insulating connection members.

6. The secondary battery module as set forth in claim 5, wherein the grooves of the main bodies of the conductive and insulating connection members are parallel with axes of the corresponding conductive and insulating connection members.

7. The secondary battery module as set forth in claim 1, wherein the fasteners comprise pairs of bolts and nuts.

8. The secondary battery module as set forth in claim 1, wherein the fasteners comprise pairs of female and male snaps, and, when one of the female and male snaps are installed on the fixing block, the other one of the female and male snaps are fixed to the air guide block.

* * * * *